(No Model.)
N. H. SWEET.
BUTTER CUTTER.
No. 292,706. Patented Jan. 29, 1884.
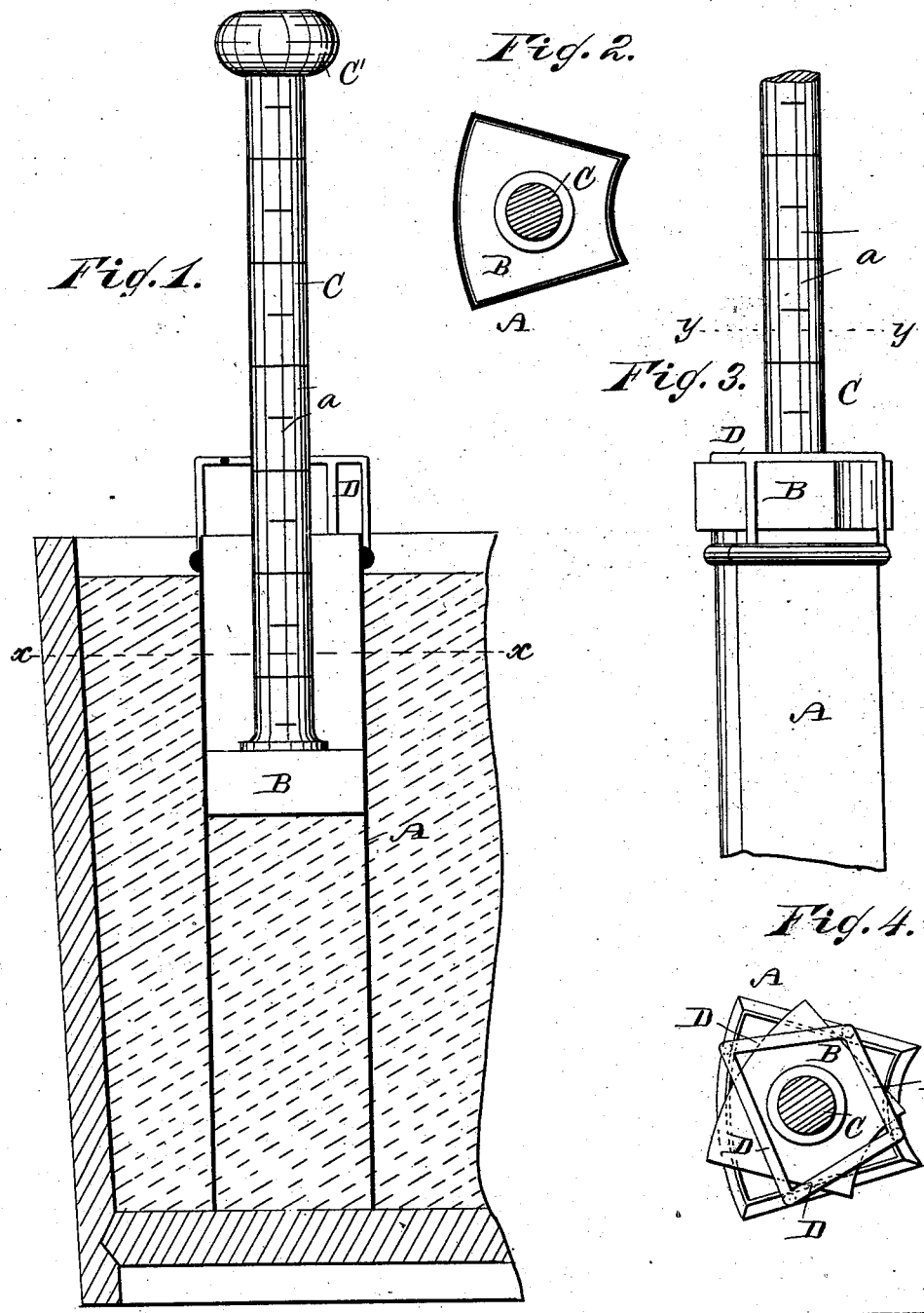
WITNESSES:
Theo. G. Hoster
C. Sedgwick
INVENTOR:
N. H. Sweet
BY Munn & Co.
ATTORNEYS.

UNITED STATES PATENT OFFICE.

NEWTON H. SWEET, OF STEPHENTOWN CENTRE, NEW YORK.

BUTTER-CUTTER.

SPECIFICATION forming part of Letters Patent No. 292,706, dated January 29, 1884.

Application filed June 22, 1883. (No model.)

*To all whom it may concern:*

Be it known that I, NEWTON H. SWEET, of Stephentown Centre, in the county of Rensselaer and State of New York, have invented a new and Improved Butter-Cutter, of which the following is a full, clear, and exact description.

The object of my invention is to provide a new and improved device for removing butter, lard, &c., from jars, tubs, &c., in regularly-shaped cakes or blocks, which device at the same time can be used for separating certain given quantities from the rest without requiring the said quantities to be weighed; and to this end it consists in the peculiar construction and arrangement of parts, as hereinafter fully described, and pointed out in the claims.

Reference is to be had to the accompanying drawings, forming a part of this specification, in which similar letters of reference indicate corresponding parts in all the figures.

Figure 1 is a longitudinal sectional elevation of my improved device for removing butter from jars. Fig. 2 is a sectional plan view of the same on the line $x\ x$, Fig. 1. Fig. 3 is a side view, showing the piston raised. Fig. 4 is a sectional plan view of the same on the line $y\ y$, Fig. 3.

A tubular vessel, A—that is, a longitudinal vessel open at the top and bottom—is provided with a plunger or piston, B, fitting closely therein, which piston is secured to or made integral with a handle-rod, C. The tubular vessel A can be made in any desired suitable cross-section or size, but preferably is made wedge-shaped, with the ends both curved from the same center, as a tubular vessel A having this cross-section fits best against the sides of tubs, jars, &c. The handle-rod C is provided at its free end with a knob or button, C', and between the said button and the piston it is divided into a number of parts, $a$, corresponding in size, &c., to the space occupied in the tube A by a half-pound, pound, one and one-half pound of butter, &c.

On the upper end of the tube A a frame, D, is secured, the sides of which run diagonally to the sides of the end of the tube. The top of the frame D is such a distance above the top edge of the tube A that the piston can be passed between the top edges of the tube A and the bars of the frame D, as shown in Figs. 3 and 4. The frame D can be made of wire or can be cast. The tube A can be made of any desired suitable material.

The device is used as follows: The piston B is raised, and is then turned so that it will rest on the end of the tube A and below the rods of the frame D, as shown in Figs. 3 and 4. The tube A is then forced down into the butter, with which it becomes filled. The tube is withdrawn, the piston B is turned so that it will fit in the tube, and the butter is forced out of the bottom of the tube by forcing the piston into the tube. The quantity of butter forced out of the tube is shown by the subdivisions $a$ on the rod C, each of which subdivisions can correspond to one-fourth or one-half or one pound, &c. The butter from the bottom of the tub—that is, the butter apt to become rancid first—is removed first by means of my improved device. Ice-cream, lard, &c., can be removed from pails, &c., in a like manner by means of the device.

The above-described device may also be used as a butter-trier, and the butter not required can be placed back into the tub by pressing the said butter out by means of the piston B.

Having thus described my invention, I claim as new and desire to secure by Letters Patent—

1. The combination, with the tube A, open at both ends, and the piston B, having handle-rod C, of the frame D, secured to the upper end of the tube, with its sides diagonal to those of the tube and at a distance above the top of the tube equal to or greater than the thickness of the piston, substantially as herein shown and described, and for the purpose set forth.

2. The tube A, open at both ends, and having a cross-section in the shape of a wedge, with its ends curved from the same center, and the frame D, secured to the upper end of the tube, with its sides diagonal to those of the tube, in combination with the correspondingly-shaped piston B, having the graduated handle C, substantially as herein shown and described.

NEWTON H. SWEET.

Witnesses:
WM. W. CHITENDEN,
WM. H. BRIMMER.